G. H. BAILEY & H. H. BURRITT.
Improvement in Steam-Engines
No. 5,005.
Reissued July 30, 1872.
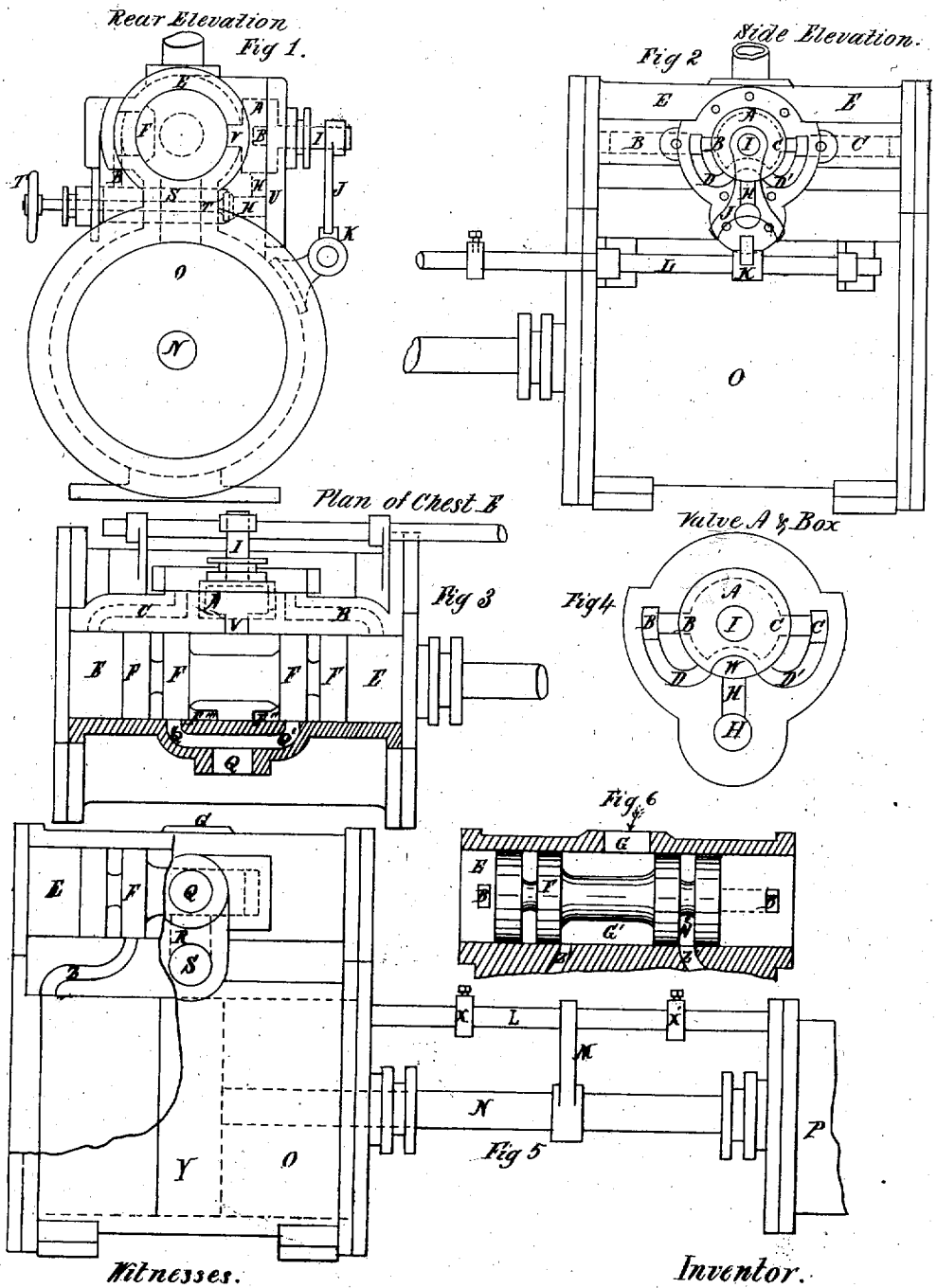
Witnesses.
Thos. S. Crane.
Fred K. Day
Inventor.
Geo. H. Bailey.
H. H. Burritt.

UNITED STATES PATENT OFFICE.

GEORGE H. BAILEY AND HARVEY H. BURRITT, OF NEWARK, NEW JERSEY, ASSIGNORS, BY MESNE ASSIGNMENTS, OF ONE-HALF INTEREST TO CHARLES M. BOLEN, THOMAS S. CRANE, AND F. K. DAY.

IMPROVEMENT IN STEAM-ENGINES.

Specification forming part of Letters Patent No. 117,362, dated July 25, 1871; reissue No. 5,005, dated July 30, 1872.

SPECIFICATION.

*To all whom it may concern:*

Be it known that we, GEORGE H. BAILEY and HARVEY H. BURRITT, of Newark city, in the county of Essex and State of New Jersey, have invented certain Improvements in Steam-Engines, of the class commonly used for pumping water, by the immediate attachment of a steam and water piston to the same rod.

These improvements relate to those parts of the machine which regulate the entrance and exit of the steam to and from the steam-cylinder, the piston of which, by its movements, operates the pump attached to the machine. Our invention relates to that class of steam-pumps employed for forcing water against pressure, as in pumping water into steam-boilers and into elevated reservoirs for water-works, or mains for the same. It is well known that in such pumps a great deal of jar is produced by the rapid movement of the water-piston, causing the valves at each end of the stroke to open and close suddenly, and the currents of water in the suction and discharge pipes to change velocity suddenly. The object of our invention is to produce such a movement of the water-piston that all concussive action of the valves and the water in the pipes connected with the pump shall be avoided. This we accomplish by a novel arrangement of valve-gearing and novel construction of the valves attached to the steam-cylinder, the piston of which controls effectually the movements of the water-piston. The valve-gearing described is operated by a connection with the steam or water piston, so as to receive an impulse before the end of each stroke of the pistons. This movement is communicated to a rotary valve, A, provided with ports B and C, for conducting live steam from the boiler to either end of the steam-chest E, in which a piston-valve, F, is arranged to supply steam to the steam-piston of the pump in such a manner as to bring the steam-piston to rest at each end of the stroke. This rest or pause of the pistons in a steam-pump has been produced hitherto by connecting two pumps together, in such a manner that the valve-gearing on each pump was operated by the steam-piston of the other pump. Our invention is designed to improve on this mode of construction by making a single pump operate its own steam and water valves, and yet secure a rest or pause of the pistons at each end of the stroke.

That our mode of construction may be fully understood, we will describe all the parts of the mechanism employed, referring to the drawing attached to this application.

Figure 1 is a rear elevation of the steam-cylinder O of a steam-pump constructed according to our plan, with a steam-chest, E, attached to it, in which a piston-valve, F, operates to admit steam to either end of the cylinder O, as required. Fig. 2 is a side elevation of the steam-cylinder O, with the steam-chest E, valve A in its box, and valve-gearing I J K L. Fig. 3 is a plan, showing steam-chest E and piston-valve F in section, so as to exhibit the arrangement of the steam-passages B C and the exhaust-passages Q. Fig. 4 is an enlarged and detached view of the rotating valve A and the box in which it rotates, between the ports B C. Fig. 5 is a connected view of the steam-cylinder O and water-cylinder P, one end of which is shown in the view. Fig. 6 is a side sectional view of the steam-chest E with the piston-valve at the end of its stroke, so that steam is entering the passage Z to the steam-cylinder O, and the exhaust-passage Z′ is open, connecting with the opposite end of the cylinder O.

The objects of this mechanism are, to admit steam to the steam-cylinder at the beginning of the stroke, to cut off the supply of steam a little before the end of the stroke, and to close the corresponding exhaust-port at the same time, (a little before the end of the stroke,) so as to prevent the escape of the outgoing steam and cushion in the cylinder on what remains confined, in order to bring the piston to rest easily and quietly. The time necessary for this cushioning, and the pause of the piston at the end of the stroke, is obtained by making the parts of the piston-valve (marked in Fig. 3 as F F F F) that cover the steam-ports Z Z′ (and the exhaust-ports Q) of a greater width than the steam-ports themselves; and this time is further regulated by a regulating-valve, T, Fig. 1, which controls the rapidity with which the valve F makes its movements in chest E. Supposing all the parts of the pump to be in a central position, as shown in Figs. 1 to 5, and the steam to be admitted to chest E by induction-pipe G, if the valve A be then turned so as to admit steam to port B, the effect of that steam is to move the piston-valve F into the position shown in Fig. 6, where steam-port Z (admitting steam to the rear end of the main steam-cylinder) is shown open to the live-steam chamber G′, and steam-port Z′ (allowing the escape of exhaust steam from the front end of steam-cylinder) is shown connecting with the space Z″ between two of the parts of the piston-valve F. This space Z″, when the valve F stands as in Fig. 6, also connects with the main exhaust Q′, thus making an open communication between the cylinder O and the air (or condenser, if the exhaust steam is to be condensed.) With the steam and exhaust ports in this condition, the steam-piston Y makes its forward stroke until the arm M attached to piston-rod N strikes the collar X′ on valve-shifting rod L. This moves the rod L, knocker or dog K, frog J, and valve A so as to open steam-port C, and admit steam into chest E to move piston-valve F. It will be noticed that when the valve A is moved to open port C it also brings chamber W into communication with passage D and port H. This H is the exhaust-port for steam-chest E, (required for the discharge of the spent steam first used to give motion to valve F,) and it opens directly into passages S and R, which lead to the main exhaust-outlet Q of the cylinder O. But before the exhaust steam from either end of chest E can pass from passage H into S, it meets the face or button-disk of regulating-valve T, which may be set more or less open, at the will of the operator; and it is evident that the rapidity with which the piston-valve F moves in its chest E (so as to close the port that supplies one end of the cylinder O with steam and opens the port to supply the other end) will depend upon the opening of this valve T, which regulates the escape of steam from the end of chest E, toward which the valve F is moving. As it is possible to rotate valve A from one of its usual positions to the other with a very small movement of rod L and arm M, it is easy to secure the opening of the port B or C before the piston-valve F (checked in its motion by the regulating-valve T) has entirely closed the steam-port Z or Z′; but even after that port has been closed the steam already in cylinder O may produce motion of piston Y by its expansive force. As observed, the faces of valve F are made much wider than the ports Z Z′ and Q Q′. The effect of this construction is to close the exhaust-port Q or Q′ by the first part of the valve's motion F, and then the remainder of the motion (the time of which is wholly controlled by valve T) is occupied by the passage of the lap of the valve over the closed port. During all this time, the exhaust being closed, the piston Y is cushioning against the exhaust steam confined in the cylinder, and is thus brought to a state of rest without concussion, the duration of this rest being easily controlled by valve T, which permits valve F to take any time desired to complete its travel and throw live steam into the cylinder to start the piston in the opposite direction. It will be noticed that the piston-valve F requires a cover, F″ and F‴, (which might be made continuous,) attached to it, (shown in Figs. 1 and 3,) to cover the exhaust-ports Q and Q′ when at the extreme ends of its stroke. A small recess, with plunger fitted to it, might be made in each end of the chest E, to check the motion of valve F at the ends of its stroke and avoid concussion with hard metal. The steam from main steam-chest E is admitted to valve A by an opening marked V on Figs. 1 and 2. I is the stem of the rotating valve A, by which it is turned in its box.

Having thus fully described the nature and objects of our invention, what we claim, and desire to secure by Letters Patent, is as follows, observing that, although we have shown the application of this steam mechanism simply to a water-pump, we do not confine ourselves to any particular application of our invention:

*Claims.*

1. The piston-valve F, as described, with four pistons and cover F″ and F‴.

2. The combination of the rotating valve A with the piston-valve F, as described.

3. The valve-chest E, constructed with steam-induction port G, passages V Q Q′, and eduction-ports Z and Z′, arranged substantially as shown and described.

4. A regulating-valve, T, when used in combination with a piston-valve, to regulate the discharge of the exhaust steam which has been used to give motion thereto.

G. H. BAILEY.
H. H. BURRITT.

Witnesses:
FREDK. K. DAY,
THOS. S. CRANE.